(12) United States Patent
Parekh

(10) Patent No.: US 7,724,696 B1
(45) Date of Patent: May 25, 2010

(54) PREDICTIVE READER POWER MANAGEMENT

(75) Inventor: Jateen P. Parekh, San Francisco, CA (US)

(73) Assignee: Amazon Technologies, Inc., Incline Village, NV (US)

( * ) Notice: Subject to any disclaimer, the term of this patent is extended or adjusted under 35 U.S.C. 154(b) by 1060 days.

(21) Appl. No.: 11/277,880

(22) Filed: Mar. 29, 2006

(51) Int. Cl.
    *G08C 17/00* (2006.01)
(52) U.S. Cl. .............. 370/311; 455/343.3; 455/343.4; 455/343.5; 455/344; 455/346; 455/574; 455/556.1; 455/556.2; 345/104; 345/173; 345/211; 434/317; 434/327; 713/322; 713/324; 707/10
(58) Field of Classification Search .......... 370/311; 455/343.2, 343.4, 343.5, 344, 346, 556.1, 455/556.2, 574; 345/104, 173, 211; 434/317, 434/327; 713/322, 324; 707/10
    See application file for complete search history.

(56) References Cited

U.S. PATENT DOCUMENTS

| | | | | |
|---|---|---|---|---|
| 3,332,076 A * | 7/1967 | Burson, Jr. | ............ | 340/384.71 |
| 4,159,417 A * | 6/1979 | Rubincam | .................... | 235/375 |
| 4,884,974 A * | 12/1989 | DeSmet | ...................... | 434/317 |
| 4,980,836 A * | 12/1990 | Carter et al. | ................ | 713/322 |
| 5,339,091 A * | 8/1994 | Yamazaki et al. | ........... | 345/104 |
| 5,504,907 A * | 4/1996 | Stewart et al. | .............. | 713/324 |
| 5,663,748 A * | 9/1997 | Huffman et al. | ............ | 345/173 |
| 5,847,698 A * | 12/1998 | Reavey et al. | ............... | 345/173 |
| 5,897,324 A * | 4/1999 | Tan | ............................ | 434/317 |
| 6,241,527 B1 * | 6/2001 | Rast | ........................... | 434/327 |
| 6,704,733 B2 * | 3/2004 | Clark et al. | ................... | 707/10 |
| 7,019,737 B1 * | 3/2006 | Asai et al. | ................... | 345/211 |
| 7,212,843 B2 * | 5/2007 | Boos et al | ................... | 455/574 |
| 7,324,468 B2 * | 1/2008 | Fischer | ....................... | 370/311 |

\* cited by examiner

*Primary Examiner*—Stephen M D'Agosta
(74) *Attorney, Agent, or Firm*—Lee & Hayes, PLLC

(57) ABSTRACT

Power management features of a reader device control an amount of electrical energy supplied to the reader device. The power management features include several power control categories that a user may select to affect an amount of power consumed by the reader device. One power control category controls power consumption based on a genre of an electronic book being processed by the reader device. Another power control category controls power consumption based on a time of day an electronic book is being processed by the reader device. Power control instructions that control how much power a reader device consumes may also be generated based on a characteristic of a user's interaction with the device.

4 Claims, 15 Drawing Sheets

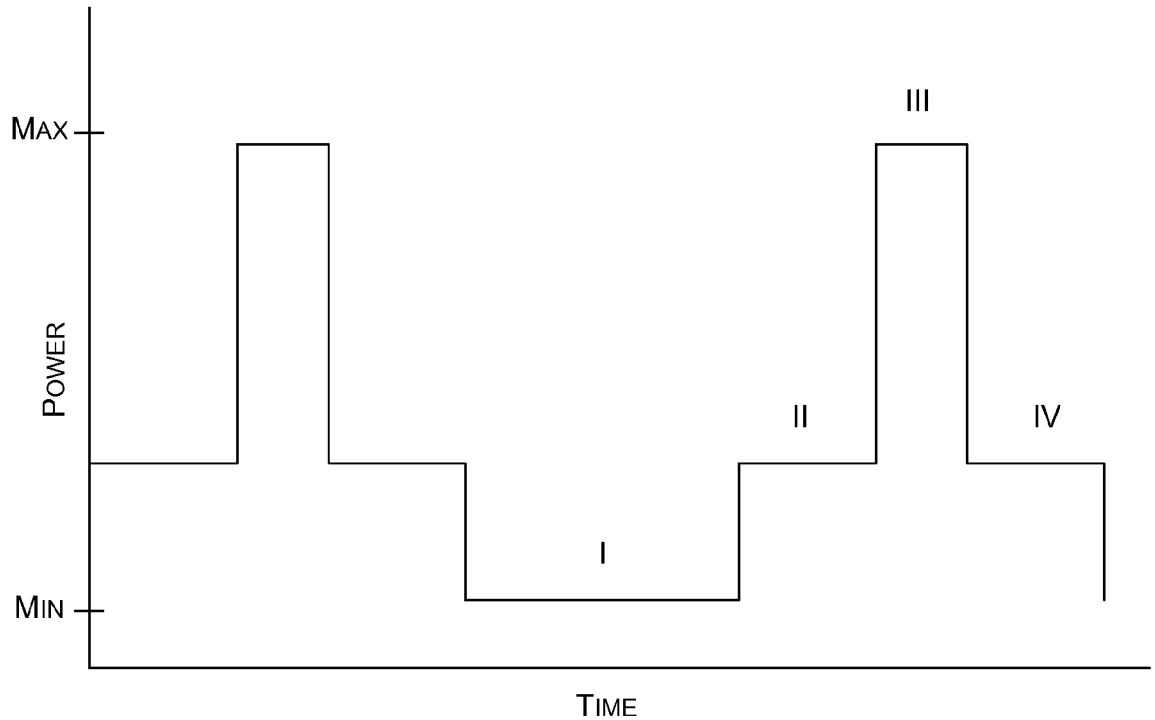

EXEMPLARY EBOOK
DEVICE POWER GRAPH
1600

I. LOW POWER STATE. PROCESSING UNIT IS IN MINIMUM POWER DRAW STATE AND SUBSYSTEMS ARE CONSUMING MINIMUM POWER.

II. MEDIUM POWER STATE. PROCESSOR AND SUBSYSTEMS CONSUMED SUFFICIENT POWER TO PLACE PAGE(S) IN MEMORY.

III. FULL POWER STATE. PROCESSOR AND SUBSYSTEMS ARE OPERATING AT FULL CAPACITY. PAGE IS RENDERED ON DISPLAY OF EBOOK READER DEVICE.

IV. MEDIUM POWER STATE. OCCURS BEFORE ENTERING LOW POWER STATE.

*Fig. 16*

PREDICTIVE READER POWER MANAGEMENT

BACKGROUND

Electronic distribution of information has gained in importance with the proliferation of personal computers, and has undergone a tremendous upsurge in popularity as the Internet has become widely available. With the widespread use of the Internet, it has become possible to distribute large, coherent units of information, such as books, using electronic technologies. Books and other printed works distributed using electronic technologies are commonly referred to as electronic books ("eBooks"). Various entities make eBooks available for download over ordinary network connections, such as broadband and dialup connections.

Typical eBook reader devices attempt to mimic the experience of reading a conventional paper book or other printed works through display of electronic information on one or more electronic displays. A typical eBook reader device is a handheld digital device having a liquid crystal display panel and enough memory and processing capability to store several eBooks. Such a device is capable of retrieving and displaying an eBook or portion of an eBook for reading.

There are some advantages to using an eBook reader device over conventional paper books or other printed works. An eBook reader device is often capable of storing a number of complete unabridged works. Therefore, an eBook reader containing a number of stored printed works weighs significantly less than the same number of printed works. This makes an eBook reader a particularly attractive alternative to printed works for travel, educational purposes, and professional business use. Also, because eBooks do not require the use of paper products, they are generally offered at a lower price than their printed counterparts. Furthermore, the use of eBook reader devices in conjunction with printed works may be beneficial to the ecosystem, by reducing a number of books produced using paper products.

To date, however, eBook reader devices and the use of eBooks in general have not achieved widespread consumer acceptance. This is mainly attributable to the design and implementation particulars of conventional eBook reader devices.

Battery life is one reason the use of conventional eBook reader devices has not gained widespread popularity. Limitations on battery life particularly limit and affect the use of an eBook reader. Unlike many portable devices, an eBook reader is often in use over a large timeframe (e.g., multiple hours). During this timeframe, a display of the device may be energized with electrical energy in order to display content (e.g., text and pictures) of an eBook. Furthermore, other internal components of the eBook reader are also energized to facilitate retrieval and transfer of eBook content from memory to a display of the eBook reader. These operations of an eBook reader often limit battery life to a few hours.

Conventional portable device battery management systems have been developed. One such management system dims a display of a portable device after a relatively long idle time (typically 1 to 5 minutes). Another such management system reduces power to a hard drive after a period of idle time (typically 10 to 30 minutes). Unfortunately, these management systems do not generally have the appropriate functionality for use with eBook reader devices.

Operationally, an eBook reader device functions differently than many other conventional portable devices. The functionality differences generally render current battery management systems ineffective when they are used with eBook devices. For example, dimming a display of an eBook reader after a relatively long idle time would provide little, if any, battery saving functionality. Often, a user of an eBook reader would actuate a page turn of an eBook long before the long idle time expires. Even if the idle time were to expire before actuation of a page turn, dimming a screen of an eBook reader device may create an undesirable reading experience for a user of the eBook reader device.

Similarly, the practice of reducing power to a hard drive after a period of 10 to 30 minutes does not achieve significant battery savings when used with eBook reader devices. Generally, an eBook reader device that uses a hard drive will need frequent, yet brief, use of the drive. This frequent use is generally related to providing content for display on a display of an eBook reader. Therefore, the technique of reducing power to a hard drive after a rather long period is generally ineffective in helping to extend battery life, when used in conjunction with an eBook reader.

The preceding description of various disadvantages of portable device battery management systems, as applied to conventional eBook reader devices, was provided herein for contextual reasons only.

SUMMARY

An electronic book ("eBook") reader device and a method for operating an eBook reader device are provided that include enhanced power management features designed to reduce unnecessary use of power and prolong battery life between battery charges. Power management properties are selectable through an interface of an eBook reader device. The power management properties include power control instructions sets associated with a genre of an eBook processed by an eBook reader device. Other power control instructions sets are associated with a time of day an eBook reader device is operating. User behavior may also used to determine specific power control instructions sets used during an operating session of an eBook reader device. These user behavior derived power control instructions sets are created based on a manner in which a user operates an eBook reader device. Observing the manner in which a user operates an eBook reader device allows a set of derived power control instructions to substantially predict when and/or how a user will interact with the device. This may help reduce an amount of power consumed by the reader device. A given user may have various related user specific power control instructions sets that relate to a genre of an eBook processed by an eBook reader device, or a time of day an eBook reader device is operating.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 16 is an exemplary power graph that illustrates power consumed by an eBook reader device in accordance with one or more described power control implementations.

DETAILED DESCRIPTION

This disclosure is directed to an exemplary eBook reader device that includes systems and methods that provide predictive power control management based on various parameters or usage characteristics, including an amount of time that elapses between page turns. The power management systems and methods include a plurality of pre-defined user power control models that a user may select. The pre-defined user models are displayed as part of a graphical interface that the reader device implements. The power management systems and methods further include several user input power control models that a user may choose. The user input models are displayed and chosen using the graphical interface as well. In addition, user modeled power control is part of the power management systems and methods. The user modeled power control takes into consideration an individual's use of the reader device and adapts how power management is used with the reader device.

These and other aspects are described below in various example implementations of an eBook reader. The terms "book" and/or "eBook" as used herein include electronic or digital representations of printed and/or digital works, as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, etc. Accordingly, the terms book and/or eBook may include any content that is in electronic or digital format. It is noted, however, that various aspects and features described herein may be implemented in other electronic devices or electronic readers besides eBook reader devices including, for example, portable computers, personal digital assistants (PDAs), portable gaming devices, wireless phones, and the like.

Various examples of power management applied to an eBook reader are described below with reference to FIGS. 1-16.

Exemplary eBook Reader Device

Figure 1:
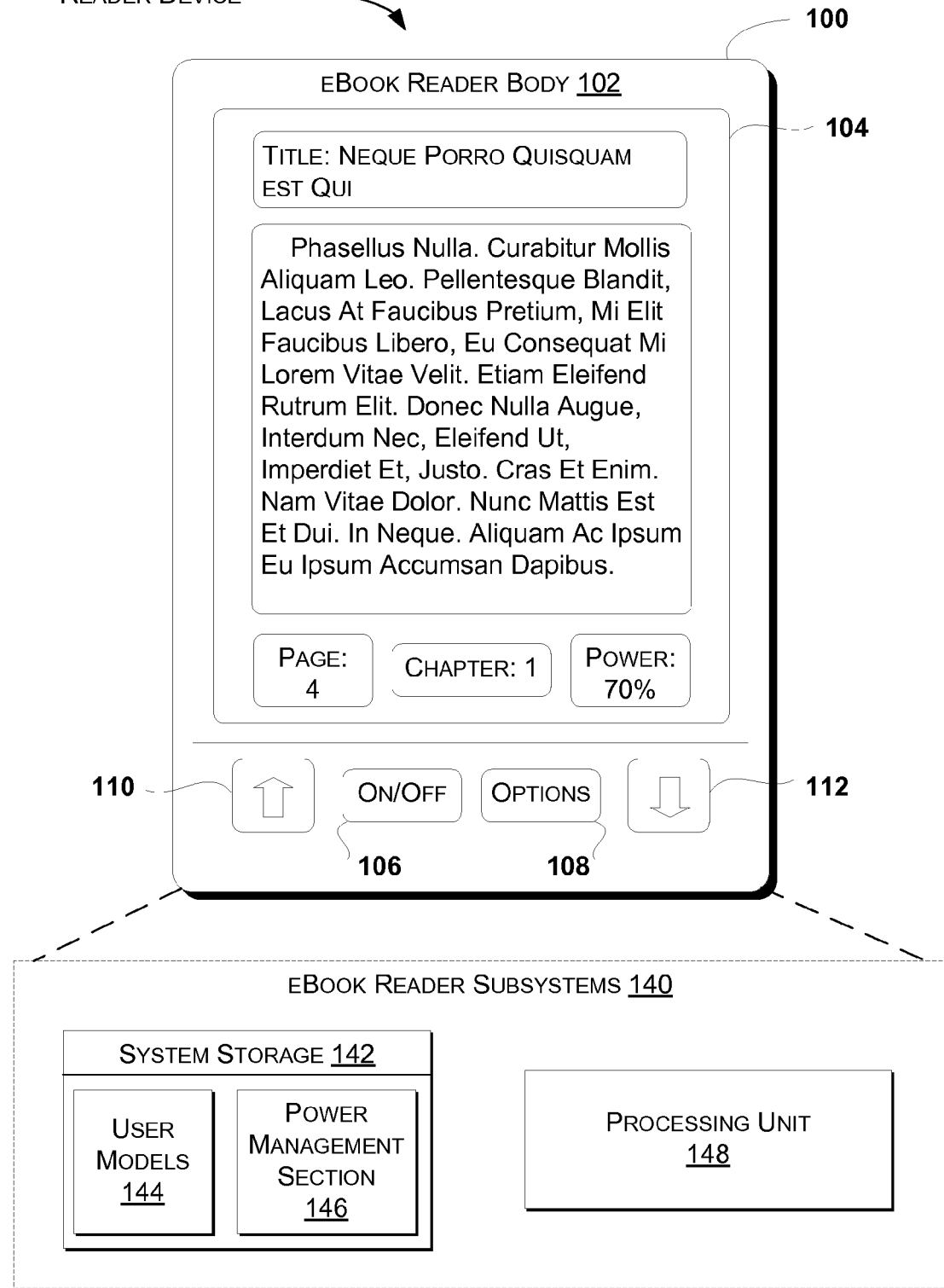
FIG. 1 illustrates an example electronic book ("eBook") reader device that implements enhanced power control instructions sets tailored for use with an eBook reader device.

An exemplary reader device is described in detail with reference to FIGS. 1-2. FIG. 1 illustrates an exemplary reader device 100 that includes a reader body 102. In one possible implementation, the device 100 is embodied as an eBook reader device. The eBook reader body 102 includes a display 104 that comprises, in this illustration, a title field, a text body section, a page field, a chapter field and a power remaining field. The texts of the title field and text body section are shown in Lorem Ipsum (i.e., place holder text). The eBook reader body 102 also includes a previous page button 110, an on/off button 106, an options button 108 and a next page button 112.

In one implementation, the display 104 is an electronic paper display, e.g., a display that possesses a paper-like high contrast appearance, low power consumption and a substantially thin, light form. In general, an electronic paper display is one that has a high resolution (150 dpi or better) and high contrast substantially equal to that of print on paper. Often electronic paper display technology is bi-stable. Displays employing bi-stable technology are capable of holding text or other rendered text even when little or no power is supplied to the display. Some exemplary electronic paper displays that may be used with the implementations described herein include bi-stable LCDs, MEMS, cholesteric, pigmented electrophoretic, and others. Non-electronic paper displays may be used with the exemplary eBook reader device 100 as well.

The eBook reader device 100 also includes various internal components, which are defined by eBook reader subsystems 140 illustrated in FIG. 1. In one implementation of the eBook reader device 100, the subsystems 140 include a system storage 142 and a processing unit 148. The processing unit 148 interacts with the system storage 142 to facilitate operation of the eBook reader device 100.

The system storage 142 includes user power control models 144 and a power management section 146. As described below, the user power control models 144, in concert with the power management section 146, control an amount of power consumed by the eBook reader device 100.

Figure 2:
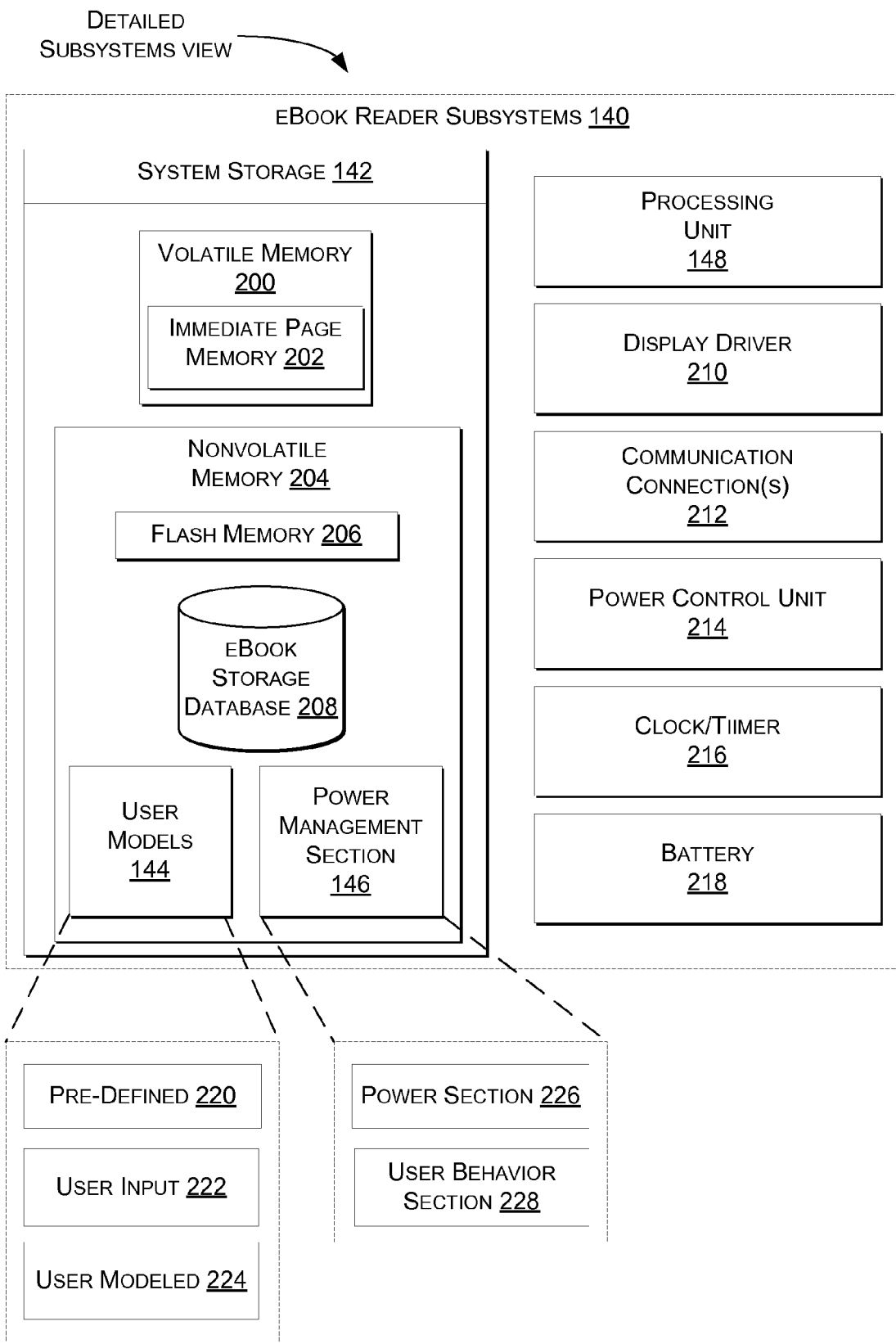
FIG. 2 illustrates exemplary eBook reader subsystems that may be used in conjunction with enhanced power control instructions sets tailored for use with an eBook reader device.

FIG. 2 illustrates an exemplary detailed view of the eBook reader subsystems 140. In a very basic configuration, the subsystems 140 include the processing unit 148, the system storage 142 and a display driver 210 for controlling eBook content output to the display 104. Depending on the exact configuration of an eBook reader device 100, the system storage 142 includes a volatile memory 200 (such as RAM) and a nonvolatile memory 204. The volatile memory 200 includes a memory portion designated as an immediate page memory 202. The immediate page memory 202 may include one or more pages of an eBook. The pages held by the immediate page memory 202 are placed therein a short period before a next page request is expected. Use of the immediate page memory 202 is described in further detail below.

The term "page" as used herein refers to a collection of content that is presented at one time in the display 104. Thus, a "page" as described herein may be understood as a virtual frame of the content, or a visual display window presenting the content to the user. Thus, "pages" as described herein are not fixed permanently, in contrast to the pages of "paper" books or other printed works. Instead, pages described herein may be redefined or repaginated when, for example, the user chooses a different font for displaying the content in the display 104.

The nonvolatile memory 204 includes a flash memory 206 that typically contains an operating system of the eBook reader device 100. The memory 204 also includes an eBook storage database 208 that is used to store a plurality of eBooks that are displayable on the display 104. The nonvolatile memory 204 also includes the user power control models 144 and the power management section 146. In the implementation shown in FIG. 2, the user power control models 144 include a pre-defined section 220, a user input section 222 and a user modeled section 224. The power management section 146 includes a power control instructions section 226 and a user behavior section 228. The sections 226 and 228 each include power control instructions sets that may be used to control an amount of power consumed by the eBook reader device 100. The power control instructions sets are linked to the user power control models 144. Additional details of the user power control models 144 and the power management section 146 are provided below.

The eBook reader subsystems 140 also include a power control unit 214 and a battery 218. The power control unit 214 operatively controls an amount of power, or electrical energy, consumed by the eBook reader device 100. Actively controlling the amount of power consumed by the reader device 100 may achieve more efficient use of electrical energy stored by the battery 218. The manner in which the power control unit 214 controls an amount of power consumed by the eBook device 100, in particular the subsystems 140, is dictated by the power control instructions sets of the power management section 146. The processing unit 148 supplies computing resources to the power control unit 214.

The eBook reader subsystems 140 may also include a communication connection(s) 212 that allows the eBook reader device 100 to communicate with other devices, such as over a network (e.g., the Internet). The communication connection(s) 212 is one example of communication media. Communication media may typically be embodied by computer readable instructions, data structures, program modules, or other data in a modulated data signal, such as a carrier wave or other transport mechanism, and includes any information delivery media. A clock/timer 216 is also part of the eBook reader subsystems 140. The clock/timer 216 may be used by the power control unit 214 during a process of controlling an amount of power consumed by the reader device 100.

The eBook reader device 100 may have additional features or functionality. For example, the eBook reader device 100 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

The system storage 142 is an exemplary example of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 100. Any such computer storage media may be part of the eBook reader device 100. The eBook reader device 100 may also have input device(s) such as keyboard, mouse, pen, voice input device, touch input device, external electrical energy connectivity, etc. Output device(s) such as an auxiliary display, speakers, printer, etc. may also be included. Various devices described above are well known in the art and need not be discussed at length.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Exemplary Power Management

Figure 3:
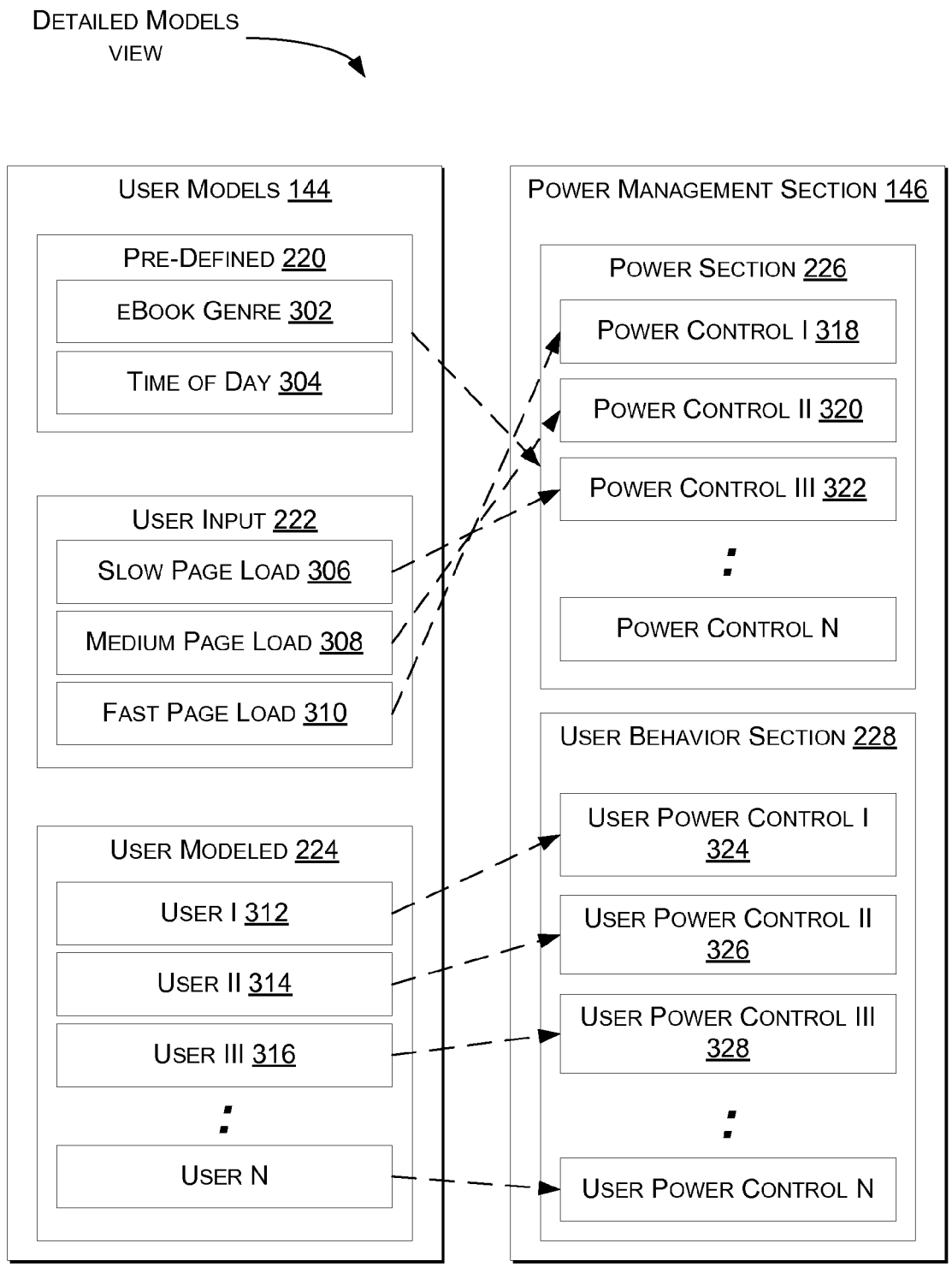
FIG. 3 illustrates contents of a system storage that is contained within an eBook reader device. The contents include user power control models that are linked to various power control instructions sets.
Figure 4:
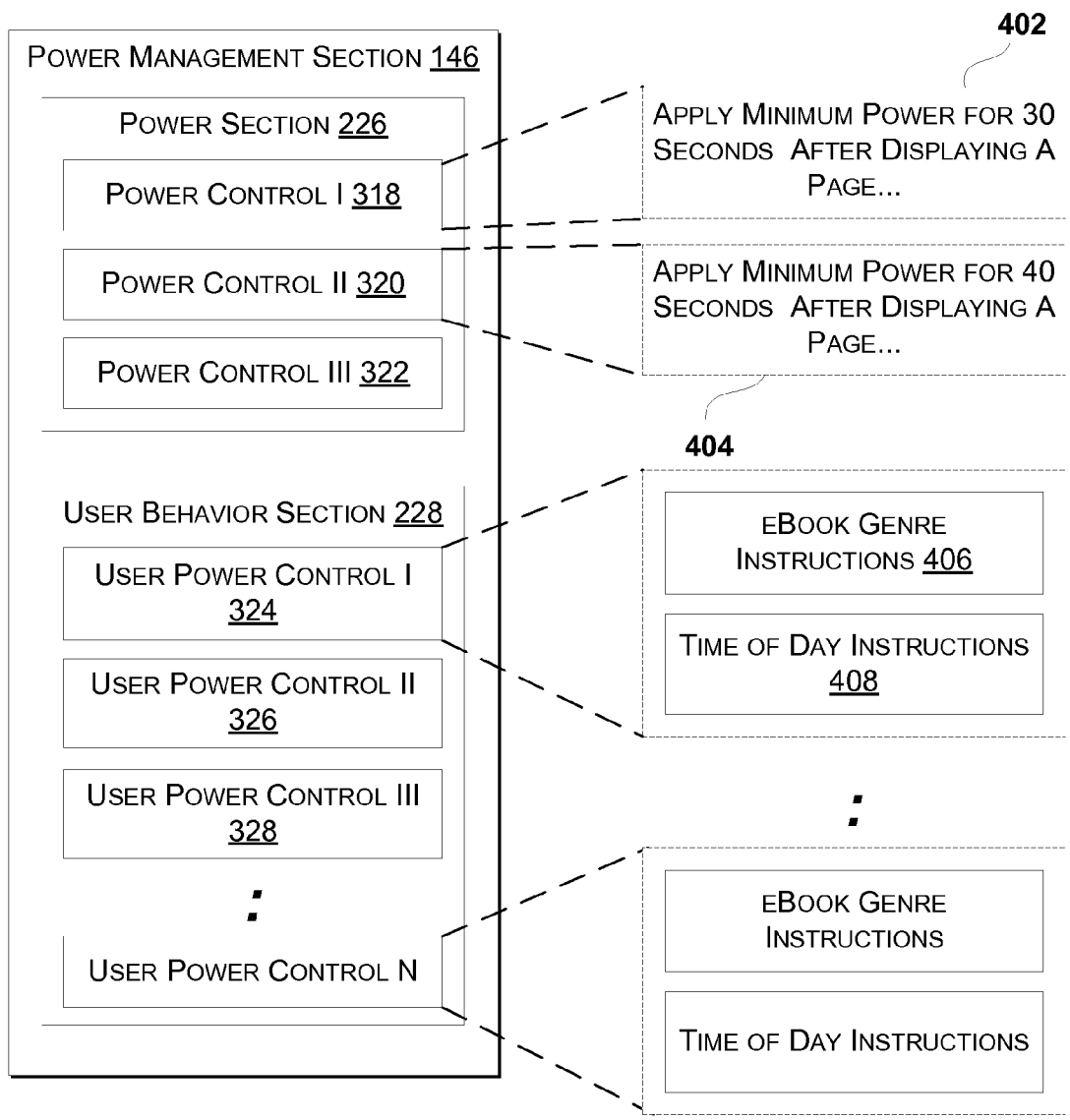
FIG. 4 illustrates various exemplary details of power control instructions sets that may be used to control an amount of power consumed by an eBook reader device.

Power management of the eBook reader device 100 is coordinated by the power management section 146 in concert with the user power control models 144 that are selectable by a user of the reader device 100. FIGS. 3-4 provide further details of the user power control models 144 and the power management section 146. In general, the various models of the user power control models 144 are directly associated with power control instructions sets of the power management section 146. A user of the eBook reader device 100 may select one of the various models of the user models 144, via a graphical user interface of the eBook reader device 100, to initiate use of one of the power control instructions sets of the power management section 146. The various models of the user models 144 are described in detail first, followed by specifics that relate to the various power control instructions sets of the power management section 146.

As is illustrated in FIG. 3, the user power control models 144 are delineated into sections that include the pre-defined section 220, the user input section 222 and the user modeled section 224. Each of the sections 220, 222, and 224 is discussed in detail in the following.

The pre-defined section 220 includes models that are defined as an eBook genre model 302 and a time of day model 304. Both models 302 and 304, as well as other various models described in the following, are selectable by a user via a graphical interface of the eBook reader device 100. The eBook genre model 302 is linked to the power control instructions section 226 of the power management section 146. The time of day model 304 is linked to the power control instructions section 226 as well.

The eBook genre model 302 takes into consideration the genre (e.g., certain characteristics or data types) of an eBook processed by the eBook reader device 100 before selecting a set of power control instructions set from the power control instructions section 226. The genre of an eBook can be determined from metadata that is associated with eBooks. For example, many eBooks have associated metadata that includes title, length, copyright information, genre, etc. The eBook genre model 302 uses a genre tag in the metadata in a process of determining which power control instructions set in the section 226 will be applied to the eBook reader device 100. For example, if a user of the reader device 100 selects an eBook that is fiction, a power control instructions I set 318 is selected from the section 226. Alternatively, if a user of the reader device 100 selects an eBook that is non-fiction, a power control instructions II set 320 is selected by the eBook genre model 302. The section 226 also includes a power control instructions III set 322, which may be selected by the eBook genre model 302. For example, the eBook genre model 302 may select the power control instructions III set 322 when the genre of an eBook is comedy.

The word "genre" used herein encompasses much more than the three groups (fiction, non-fiction, and comedy) described above. Generally, the word genre describes a work that tends to conform to a certain type, kind, style, form, content, theme, and/or other characteristic that would suggest the use of a specific power management scheme. Although the power control instructions section 226 is described as having three particular power control instructions sets (318, 320, and 322), this is by way of example only. The section 226 may include additional (less as well) power control instruction sets, as is shown by power control instructions set N.

The user selectable time of day model 304 functions in a similar manner as the eBook genre model 302. However, instead of genre, the time of day model 304 uses a current time of day that the eBook reader 100 is being used as a basis for selecting one of the power control instructions sets (318, 320, 322 . . . N) of the power control instructions section 226.

A current time of day is kept by and accessible from the operating system of the eBook reader device 100. Therefore, when a user selects the time of day model 304, a current time of day is referenced and an appropriate one of the power control instructions sets (318, 320, 322 . . . N) is selected for use with the eBook reader device 100. For example, if the determined time falls between 12:00 am and 6:00 am, the time of day model 304 selects the power control instructions I set 318; between 8:00 pm and 12:00 pm, then the power control instructions II set 320; and between 6:01 am and 8:00 pm, then the power control instructions III set 322. The particular times associated with the power control instructions sets are exemplary only and may be varied in accordance with desired design particulars of the eBook reader device 100.

The user input section 222 includes three user selectable models that a user may select to affect power control management of the eBook reader device 100. The user selectable models of the user input section 222 allow a user of the eBook reader device to control power consumption of the reader device 100.

The models of the user input section 222 include a slow page load model 306, a medium page load model 308 and a fast page load model 310. The slow page load model 306 is linked to the power control instructions III set 322; the medium page load model 308 is linked to the power control instructions II set 320; and the fast page load model 310 is linked to the power control instructions I set 318. Again, the particular associations with the power control instructions sets are exemplary only and may be varied in accordance with desired design particulars of the eBook reader device 100.

The user modeled section 224 includes a number of distinct user models that are selectable based on a user of the eBook reader device 100. In FIG. 3, the distinct user models include a user I model 312, a user II model 314, and a user III model 316. As indicated by a user N model, additional distinct user models may also reside in the user modeled section 224. The user models 312-316 may be linked to unique power control instructions sets that control power consumption of an eBook reader device depending upon a genre of an eBook, the time of day an eBook is being read, etc.

Each of the distinct user models is linked to an associated power control instructions set. For example, the user I model 312 is linked to a user power control instructions I set 324; the user II model 314 is linked to a user power control instructions II set 326; and the user III model 316 is linked to a user power control instructions III set 328. The user N model is linked to a user power control instructions N set. As is described later, each of the user power control instructions sets (324, 326, 328 . . . N) is customized to a distinct user.

Unlike the models of the pre-defined section 220 and the user input section 222, the distinct user models of the user modeled section 224 are not directly selected by a user of the reader device 100. Instead, the distinct user models of the user modeled section 224 are selected based on user identification information. For example, a logon procedure may be implemented to identify and obtain identification information related to users of the eBook reader device 100. The logon procedure would be included with the operating system of the eBook reader device 100. Alternatively, biometric authentication (e.g., fingerprint user identification) may be employed by the eBook reader device 100 to identify distinct users. Technologies related to logon procedures and biometrics are known and thus are not described in further detail herein.

Once a user is identified by a logon procedure, biometric authentication, or the like, a distinct user model (312, 314, or 316) that relates to the user is located in the user modeled section 224. If the user does not have an associated model in the modeled section 224, a user model may be created. A process of creating a user model is discussed below. Once the distinct user model (312, 314, or 316) is found, an associated user power control instructions set (324, 326, or 328) is retrieved from the power management section 146 for controlling an amount of power consumed by the eBook reader device 100.

FIG. 4 illustrates exemplary details of the power management section 146. As an exemplary implementation, instructions 402 of the power control instructions I set 318 and instructions 404 of the power control instructions II set 320 are shown in the figure. The instructions 402 and 404 are preferably embodied as computer-executable instructions. Although not shown in FIG. 4, the power control instructions III set 322 also has instructions similar to the instructions 402 and 404.

The instructions 402 and 404 are used by the power management section 146 to control power consumption of the eBook reader device 100. The power management section 146 is in communication with at least the power control unit 214 and the display driver 210 during the process of implementing any of the power control instructions sets of the power management section 146. For example, if the power control instructions I 318 set associated with the fast page load model 310 is chosen, the power management section 146 sends the instructions 402 to the power control unit 214. The power control unit 214 uses the instructions 402 to control how much power is being drawn from the battery 218. The instructions 402 enumerate:

(1) apply minimum power draw for 30 seconds after a page is displayed on the display 104; (2) apply medium power draw for 10 seconds after the 30 seconds expire; (3) retrieve a next page of a current eBook from the eBook storage database 208 during the 10 seconds; (4) place the next page in the immediate page memory 202; and (5) apply full power draw after the 10 seconds expire in anticipation of user actuation of the button 112, or when a user actuates the button 112.

At minimum power draw, the power control unit 214 minimizes power consumption of the eBook reader subsystems 140. In one exemplary implementation, at minimum power draw, a majority of the eBook reader subsystems 140 are shutdown. For example, the processing unit 148, display driver 210 and the system storage 142 may all stop drawing power from the battery 218. In this implementation, the display 104 is capable of displaying content without active electrical energy input, once the content is rendered on the display 104. Therefore, the display 104 does not consume power during the minimum power draw stage. For all intents and purposes, the eBook reader subsystems 140 are in "deep sleep" mode during this stage.

In another implementation, at minimum power draw, the display 104 and the display driver 210 continue to draw power from the battery 218. This is required, for example, if the display 104 is designed from technology that requires some level of power consumption to maintain content rendered thereon. However, one or more of the other subsystems 140 are shutdown to reduce an amount of power consumed by the eBook reader device 100. Those subsystems 140 may include the processing unit 148 and the system storage 142.

At medium power, the power control unit 214 ensures the eBook reader subsystems 140 are consuming enough power to ensure that a next page of the current eBook is retrievable from the eBook storage database 208 and loadable in the immediate page memory 202. Therefore, in one implementation, the subsystems 140 are consuming power at a level that is greater than the small amount of power consumed at minimum power, but at a level that is less than full power consumption. Here, the processing unit 148 is instructed by the power control unit 214 to consume enough power to facilitate loading of the next page(s) into the immediate page memory 202. Therefore, the immediate page memory 202 will also draw enough power from the battery 218 to hold the next page(s). The operating system of the eBook reader device 100 controls the eBook reader subsystems 140 to facilitate loading of the immediate page memory 202.

At full power, the power control unit 214 ensures the eBook reader subsystems 140 are consuming power that is greater than the medium power level and which is sufficient to ensure substantially all of the eBook reader subsystems 140 and the display 104 are fully operational and ready to render a next page of the current eBook on the display 104. Once the next page is rendered on the display, the instructions 402 may be repeated.

As an alternative, the full power state occurs when active user interaction with the eBook reader device 100 transpires. Such user interaction may be the actuation of the button 112. Again, once the next page is rendered on the display, the instructions 402 may be repeated.

The instructions 404 allow the power control unit 214 to control an amount power consumed by the eBook reader device 100 in a similar fashion as described in relation to the instructions 402. However, instead of the 30 second time period for consuming minimum power, the instructions 404 use a 40 second time period (e.g., using power control instructions set II 320 associated with the medium page load model 308). The power control instructions III set 322 associated with the slow page load model 306 may include instructions with a 50 second time period for consuming minimum power.

The time periods described in the foregoing are merely exemplary. The time periods may be increased or decreased based on implementation requirements of the eBook reader device 100.

FIG. 4 also illustrates an exemplary implementation of the user power control instructions I set 324. The user power control instructions I set 324 includes two specific power control instructions sets that have been adapted based on a user's past operation of the eBook reader device 100. A manner in which user power control instructions sets are adapted to user behavior is discussed in detail below. The two power control instructions sets include an eBook genre instructions set 406 and a time of day instructions set 408. The eBook genre instructions set 406 is used when a user desires adapted power control based on a genre of an eBook; the time of day instructions set 408 is used when a user desires adapted power control based on a time of day the eBook reader device is used. Each of the other user power control instructions sets (326, 328 . . . N) may also include user adapted eBook genre instructions sets and time of day instruction sets.

Each instructions set 406 and 408 may include a plurality of power control instructions sets that may be used to control an amount of power consumed by the eBook reader device 100. For example, several user power control instructions sets may be included in the instructions set 406 in order allow for differing power control based on several distinct genre categories (e.g., fiction, non-fiction, and comedy). Moreover, several user power control instructions sets may be included in the instructions set 406 in order to allow for differing power control based on several time periods during the day.

The power control instructions sets 406 and 408, and the plurality of power control instructions sets thereof, allow the power control unit 214 to control an amount of power consumed by the eBook reader device 100 in a similar fashion as described in relation to the instructions 402 and 404. For example, one of the plurality of power instructions sets of the instructions set 406 may enumerate:

(1) apply minimum power draw for 60 seconds after a page is displayed on the display 104; (2) apply medium power draw for 10 seconds after the 60 seconds expire; (3) retrieve a next page of a current eBook from the eBook storage database 208 during the 10 seconds; (4) place the next page in the immediate page memory 202; and (5) apply full power draw after the 10 seconds expire in anticipation of user actuation of the button 112, or when a user actuates the button 112.

The power control instructions 402-408 of the of the power management section 146 are also capable of taking into consideration an amount of text to be rendered on the display 104 when determining how long the eBook reader device 100 should remain at the minimum power draw level. In particular, before rendering text on the display 104, the power management section 146 may consider how much text is included on a next page for rendering on the display 104. If the text is less than the average amount of text normally on a page, then an amount of time that the reader device 100 remains at the minimum power draw level may be reduced. For example, the minimum power draw level may be reduced from 60 seconds to 30 seconds. The minimum power draw level timeframe may be increased if the text is greater than the average amount of text normally on a page. A simple analysis of several pages associated with an eBook, or other content currently being processed by the reader device 100, may be used to determine the average amount of text normally on a page. In another example, the power management section 146 may modify how long the minimum power draw level remains active based on a font size used by the reader device 100.

As should be readily apparent from the descriptions of FIGS. 3-4, the exemplary implementations of the user power control models 144 and the power management section 146 provide organized power management for the eBook reader device 100. In particular, eBook genre or a time of day may be considered when determining how much time the eBook reader device 100 should be at a minimum power or other power consumption state. Tailoring how long the Book reader device 100 stays at a minimum power or other state helps ensure efficient use of power, without unnecessarily sacrificing how responsive the reader device 100 is to user page turn requests. The user adapted power control instructions sets (e.g., 406 and 408) offer users the option of having power control executed based on a manner in which a user previously operated the eBook reader device 100.

Although the exemplary implementations of the user power control models 144 and the power management section 146 have been described as being activated locally by the eBook reader device 100, this by way of example only. In an alternative implementation, activation, control and management of power control instructions stored in a reader device may occur over a network, such as the Internet, a local area network, a wide area network, or other wired or wireless communication medium. Accordingly, a remote server or other device/system may determine, modify, trigger, prioritize or otherwise process power control instructions implemented by an eBook reader device and communicate such instructions to the eBook reader via the communication medium. Activating, controlling and managing power control instructions of a reader device may also be achieved wirelessly, if the device incorporates wireless connectivity technology.

Exemplary Power Control Interface

Figure 5:
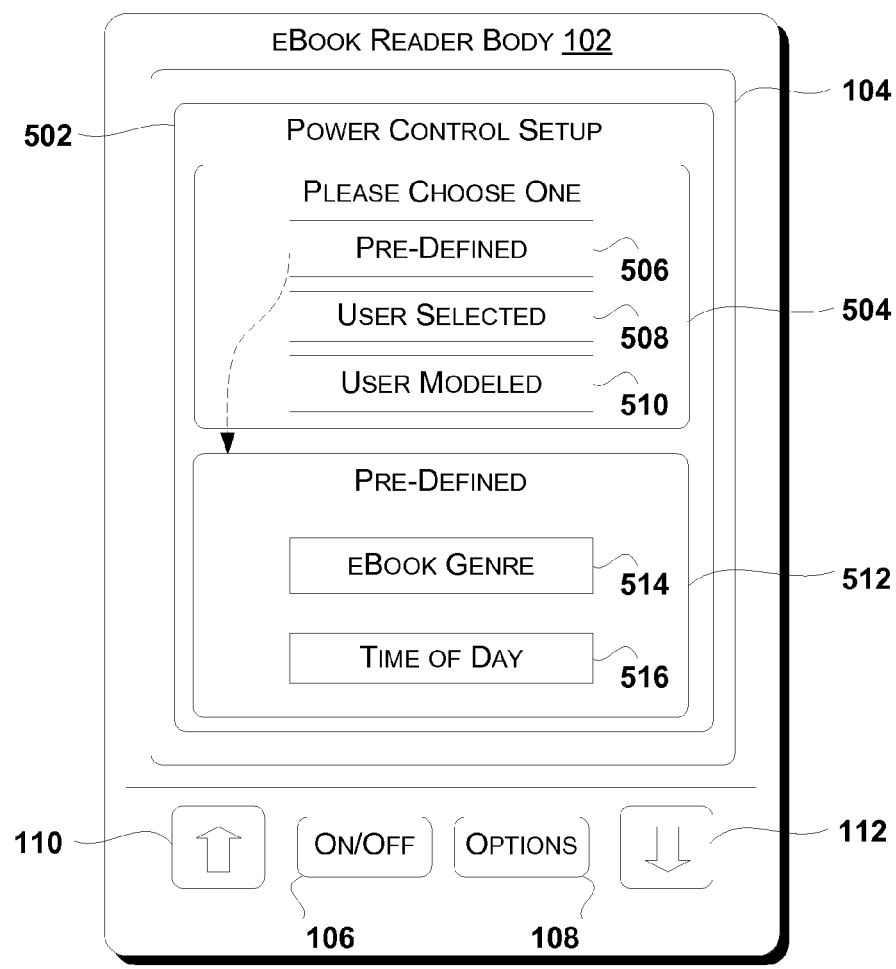
FIG. 5 illustrates a power control setup screen rendered on an eBook reader device. In this illustration, two pre-defined categories are shown, the categories useable to select distinct power control instructions sets implemented by an eBook reader device.
Figure 6:
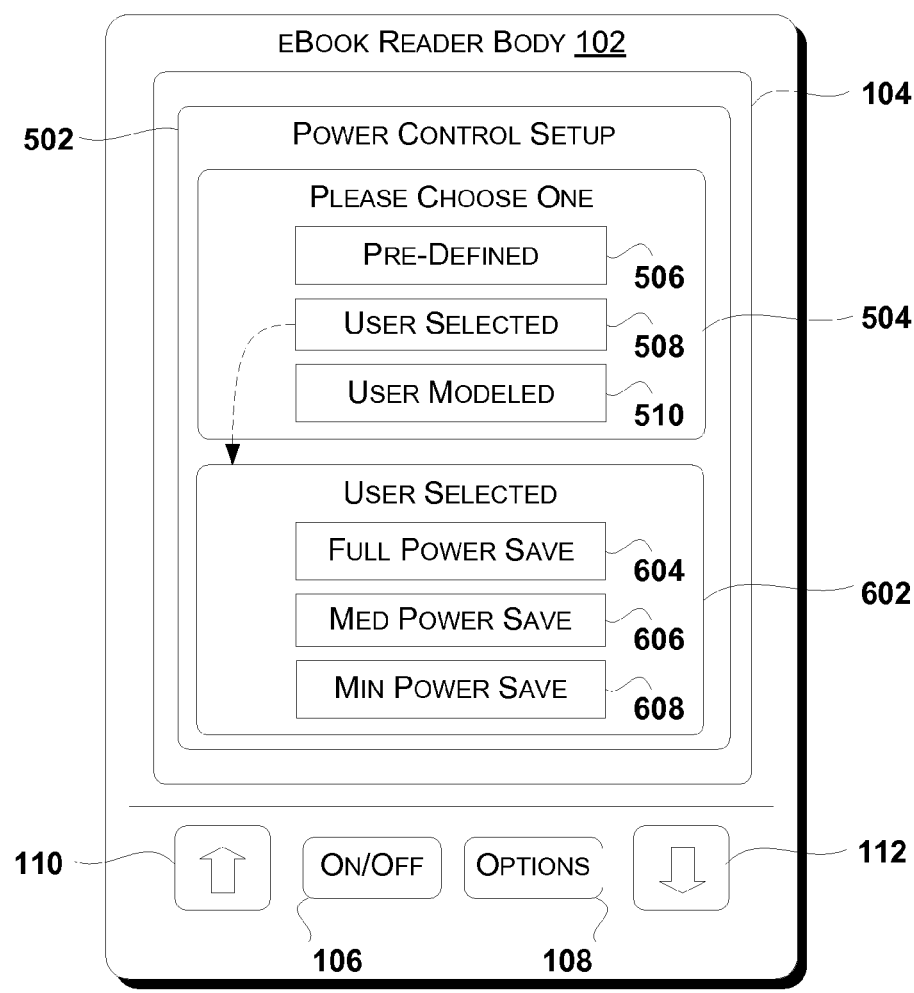
FIG. 6 illustrates a power control setup screen rendered on an eBook reader device. In this illustration, three user selectable categories are shown, where each category is linked to a power control instructions set implemented by an eBook reader device.
Figure 7:
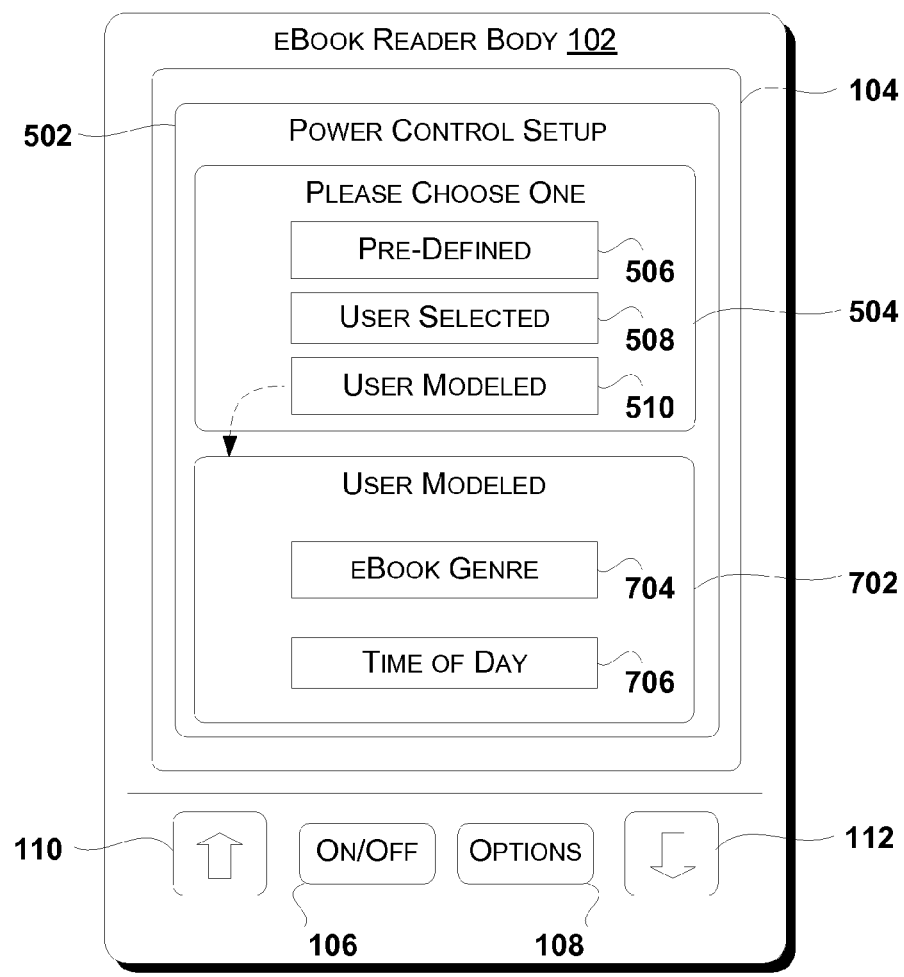
FIG. 7 illustrates a power control setup screen rendered on an eBook reader device. In this illustration, two user modeled categories are shown, the categories useable to select power control instructions sets modeled after observing use of an eBook reader device.

FIGS. 5-7 illustrate exemplary implementations of operating system power control screens that may be displayed on the display 104 of the eBook reader device 100. The illustrated power control screens may be accessed using the options button 108, through the display 104 if it is touch screen enabled, or through any suitable interface technology of the eBook reader device 100. Generally, the power control setup screens offer graphical user interfaces that allow users to select a manner in which power control affects an operation of the eBook reader device 100. Users' selections though the power control screens are linked to the user power control models 144.

As is illustrated in FIG. 5, the display 104 includes a power control setup screen 502 rendered thereon. The power control setup screen 502 includes a section 504 that includes three user selectable categories. These categories include a pre-defined category 506, user selected category 508 and user modeled category 510. FIG. 5 illustrates a pre-defined section 512 that appears after a user has selected the pre-defined category 506. The pre-defined section 512 includes an eBook genre category 514 and a time of day category 516. A user may select one of the categories 514 and 516 to initiate applicable power control for the eBook reader device 100.

FIG. 6 illustrates a user selected section 602 that appears after a user has selected the user selected category 508 of the power control setup screen 502. The user selected section 602 includes a full power save category 604, a medium power save category 606 and a minimum power save category 608. A user may select one of the categories 604, 606 and 608 to initiate applicable power control for the eBook reader device 100.

FIG. 7 illustrates a user modeled section 702 that appears after a user has selected the user modeled category 510 of the power control setup screen 502. The user modeled section 702 includes an eBook genre user adapted category 704 and a time of day user adapted category 706. A user may select one of the categories 704 and 706 to initiate applicable user adapted power control for the eBook reader device 100.

The power control screens illustrated in FIGS. 5-7 may be rendered on the display 104 each time the eBook reader device 100 is turned on with the button 106. This would compel a user to pick power control management each time the reader device 100 is powered on. Alternatively, display of the power control screens may require launching by a user of the eBook reader device 100. In such a case, the eBook reader device 100 may default to a last used power control instructions set when first powered on.

Exemplary Processes

FIGS. 8-15 illustrate example processes related to power control of an eBook reader device. Each process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the example processes of FIGS. 8-15 may be described with reference to the eBook reader device 100, the eBook reader subsystems 140, the user models 144 and the power management models 146. In particular, many acts described below may be implemented and performed by the eBook reader device 100.

Figure 8:
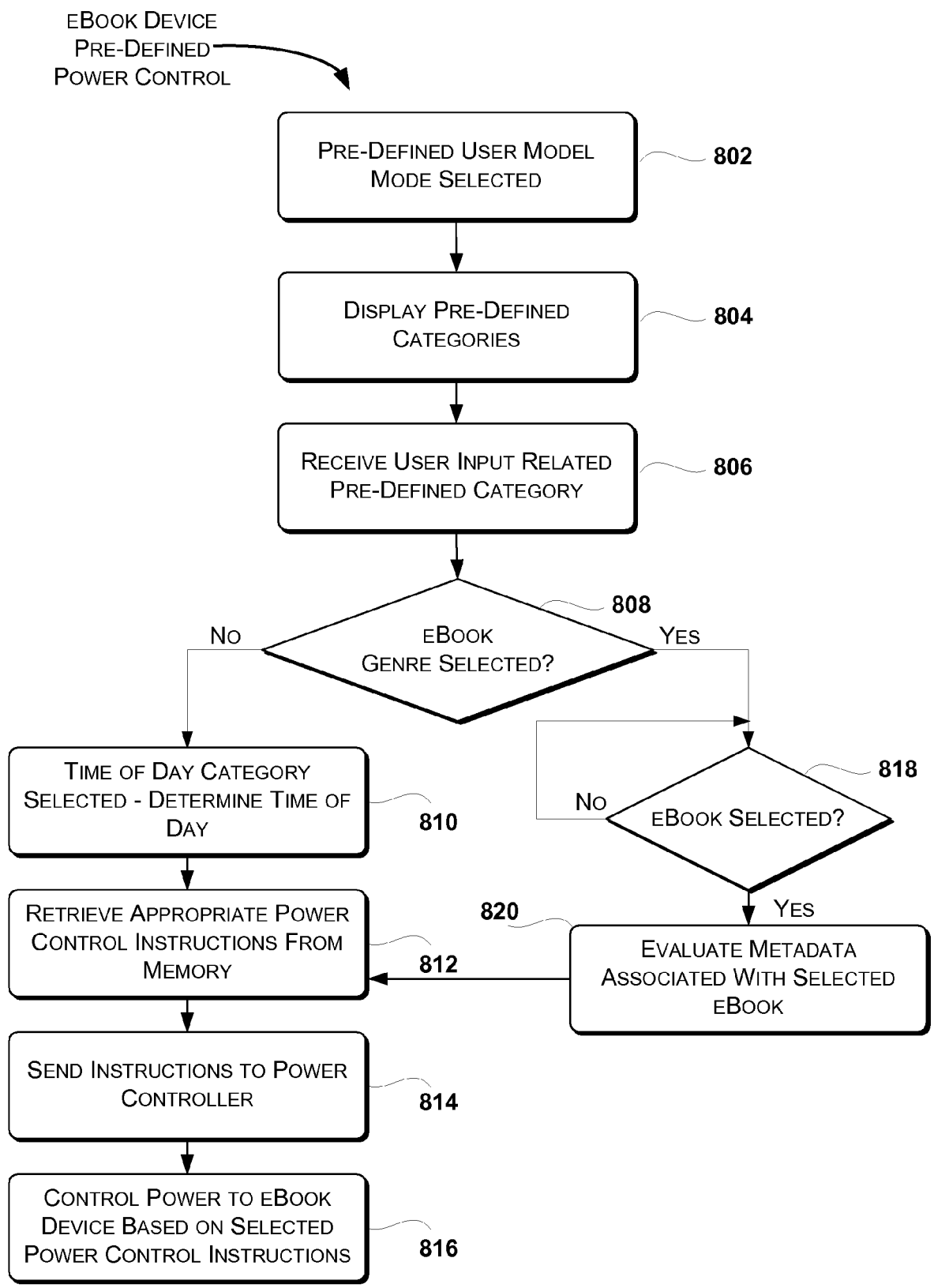
FIG. 8 is a flow diagram of a process for initiating use of pre-defined power control instructions sets on an eBook reader device.

FIG. 8 illustrates a process that occurs when a user of the eBook reader device 100 selects the pre-defined category 506 from the section 504 of the power control setup screen 502. At block 802, selection of the pre-defined category 506 is detected. At block 804, pre-defined categories are displayed. These categories may include the eBook genre category 514 and the time of day category 516. At decision block 808, it is determined which pre-defined category is selected.

At block 810, a time of day is determined by referencing a clock kept by the operating system of the eBook reader device 100. Alternatively, the timer/clock 216 of the reader device 100 may be used to determine the time of day. Based on the referenced time of day, at block 812, a power control instructions set is retrieved from the power management section 146. For example, if it is late in the evening, or very early in the morning, the power control instructions III set 322 may be retrieved from the power management section 146. The power control instructions III set 322 includes a longer minimum power time period in anticipation that a user of the eBook reader device 100 will likely turn pages of an eBook at a slower rate as compared to other times of the day. At block 814, the retrieved power control instructions set is sent to the power control unit 214. At block 816, the power control unit 214 controls an amount of power consumed by the eBook reader device 100 using the retrieved power control instructions set.

After determining at decision block 808 that the predetermined category of eBook genre was selected, a decision block 818 determines if an eBook is currently being processed/displayed on the eBook reader device 100. If a user has yet to select an eBook for use with the reader device 100, the process illustrated in FIG. 8 waits until this occurs. After an eBook is selected from the eBook storage database 208, the eBook's associated metadata is evaluated to determine a genre of the eBook (block 820).

Based on the genre of the eBook, at block 812, a power control instructions set is retrieved from the power management section 146. For example, if the genre is a novel, the power control instructions I set 318 may be retrieved from the power management section 146. The power control instructions I set 318 includes a shorter minimum power time period in anticipation that a user of the eBook reader device 100 will likely turn pages of the eBook (novel) at a higher rate as compared to other genre types. At block 814, the retrieved power control instructions set is sent to the power control unit 214. At block 816, the power control unit 214 controls an amount power consumed by the eBook reader device 100 using the retrieved power control instructions set.

Figure 9:
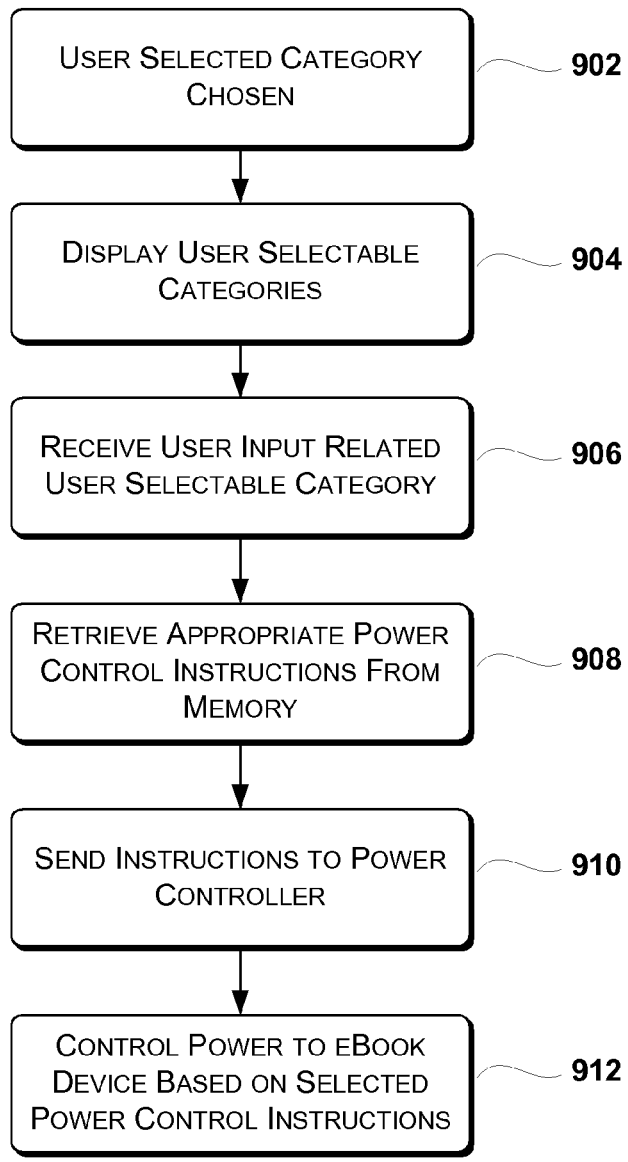
FIG. 9 is a flow diagram of a process for initiating use of user selected power control instructions sets on an eBook reader device.

FIG. 9 illustrates a process that occurs when a user of the eBook reader device 100 selects the user selected category 508 from the section 504 of the power control setup screen 502. At block 902, selection of the user selected category 508 is detected. At block 904, user selectable categories are displayed. These categories may include full power save category 604, medium power save category 606 and minimum power save category 608. At block 906, the eBook reader device 100 detects selection of one of the categories 604, 606 and 608. At block 908, a power control instructions set is retrieved from the power management section 146. For example, if the medium power save category 606 was selected, the power control instructions II set 320 may be retrieved from the power management section 146. The power control instructions II set 320 includes a minimum power time period that is longer than a minimum power time period associated with the power control instructions I set 318 and shorter than a minimum power time period associated with the power control instructions III set 322.

At block 910, the retrieved power control instructions set is sent to the power control unit 214. At block 912, the power control unit 214 controls an amount of power consumed by the eBook reader device 100 using the retrieved power control instructions set.

Figure 10:
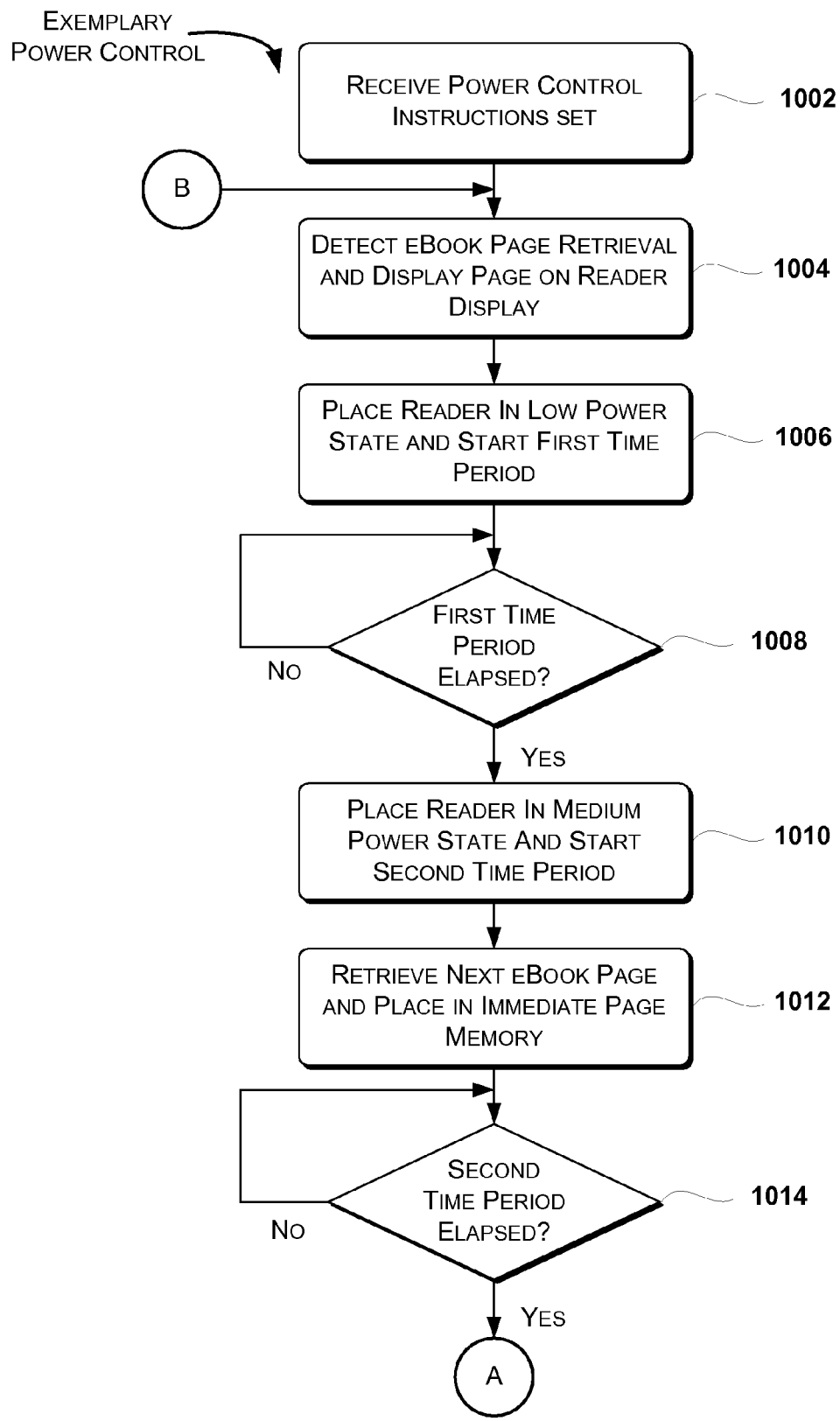
FIGS. 10-11 illustrate a flow diagram of a process for controlling an amount of power consumed by an eBook reader device.
Figure 11:
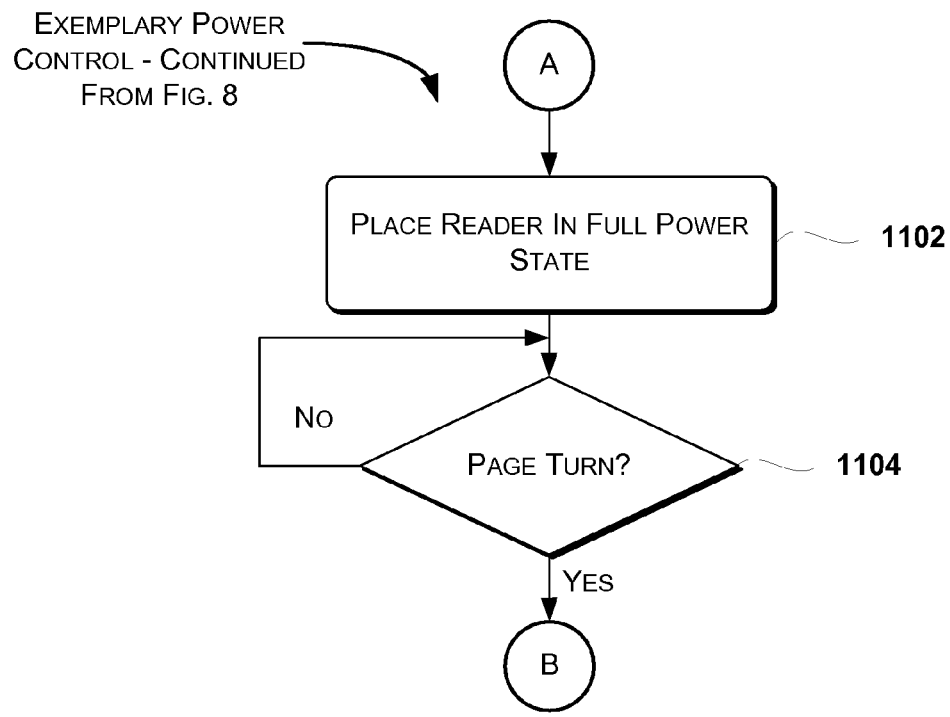
Figure 12:
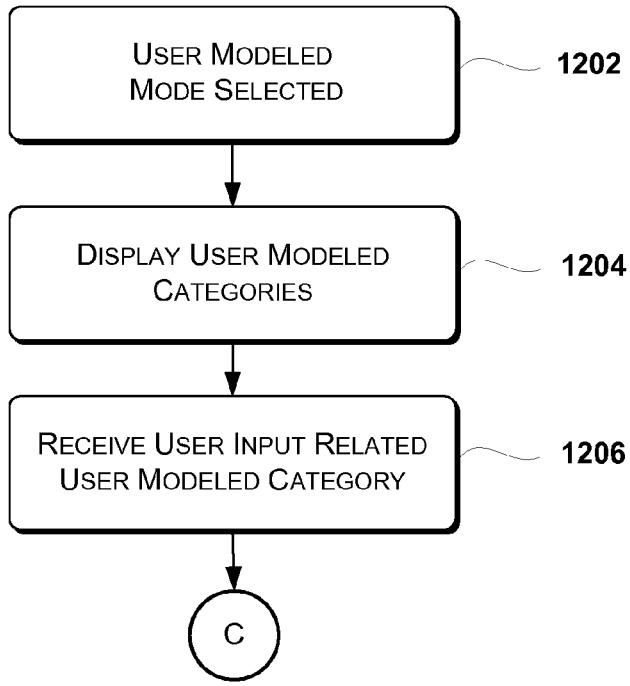
FIGS. 12-15 illustrate a flow diagram of a process for initiating use of user modeled power control instructions sets on an eBook reader device.

FIGS. 10-11 illustrate an example process used to manage power consumption of the eBook reader device 100. The illustrated example process may apply to the power control instructions sets of the power management section 146.

At block 1002, a power control instructions set is received by the power control unit 214. Generally, the power control instructions set is delivered to the power control unit 214 by the power management section 146. At block 1004, the power control unit 214 detects retrieval of a page of an eBook from the system storage 142 and display of the page (all or a portion) on the display 104. Using the received power control instructions set, at block 1006, the power control unit 214 places the eBook reader device 100 in a low power state. This may include eliminating power consumption by the processing unit 148. Alternatively, power consumption may be reduced to a level sufficient to maintain a minimum number of the eBook reader subsystems 140 active. In one exemplary implementation, the display driver 210 and the display 104 do not consume power during the low power state. This exemplary implementation requires the use of a display 104 that can maintain already rendered content thereon in the absence of an active electrical charge supplied from an electrical energy source, such as the battery 218. In another implementation, the processing unit 148 does not draw power from the battery 218 during the low power state. In yet another implementation, a clock of the processing unit 148 is set to substantially 0 MHz by the control unit 214, and the storage 142 and display driver 210 are powered down. In this state, the power control unit 214 stays active, but consumes a minimum amount of power.

Further, at block 1006, a first time period is initiated by the power control unit 214. The timer/clock 216 of the reader device 100 may be used for this purpose. The length of the first time period is specified in the received power control instructions set. After the first time period has elapsed (block 1008), the power control unit 214 places the eBook reader device 100 in a medium power state. In this state, various elements of the eBook reader subsystems 140 are enabled and draw power from the battery 218. In one exemplary implementation, the display driver 210 and the display 104 do not draw power during the medium power state. This exemplary implementation requires the use of a display 104 that can maintain already rendered content thereon in the absence of an active electrical charge supplied from an electrical energy source, such as the battery 218. However, the processing unit 148 and the system storage 142 do draw power from the battery 218, but potentially at some level that is less than one-hundred percent. In addition, at block 1010, a second time period is initiated by the power control unit 214. The length of the second time period is specified in the received power control instructions set.

At block 1012, a next page or pages of an eBook being processed by the eBook reader device 100 is retrieved from the eBook storage database 208. The retrieved next page or pages is placed in the immediate page memory 202 in anticipation of a page turn initiated by a user of the reader device 100. In one exemplary implementation, the processing unit 148 and the power control unit 214 facilitate retrieval and placement of the next page or pages for display on the eBook reader device 100. The retrieved next page or pages are placed in the immediate page memory 202 in a fully rendered state ready for display on the display 104.

Referring to FIG. 11, after the second time period has elapsed (block 1014), the power control unit 214 places the eBook reader device 100 in a full power state (block 1102). In the full power state, the eBook reader subsystems 140 are drawing maximum or near maximum power from the battery 218. Once a page turn is detected, at block 1104, the process may return to block 1004.

As an alternative to using the second time period, the eBook reader device 100 may remain in the medium power state until a user initiates a page turn. After the page turn is initiated, the eBook reader device 100 is placed in a full power state by the power control unit 214.

FIGS. 12-15 illustrate a process that occurs when a user of the eBook reader device 100 selects the user modeled category 510 from the section 504 of the power control setup screen 502. At block 1202, selection of the user modeled category 510 is detected. At block 1204, user modeled categories are displayed. These categories may include the eBook genre user adapted category 704 and the time of day user adapted category 706. At block 1206, the eBook reader device 100 detects selection of one of the categories 704 and 706.

Figure 13:
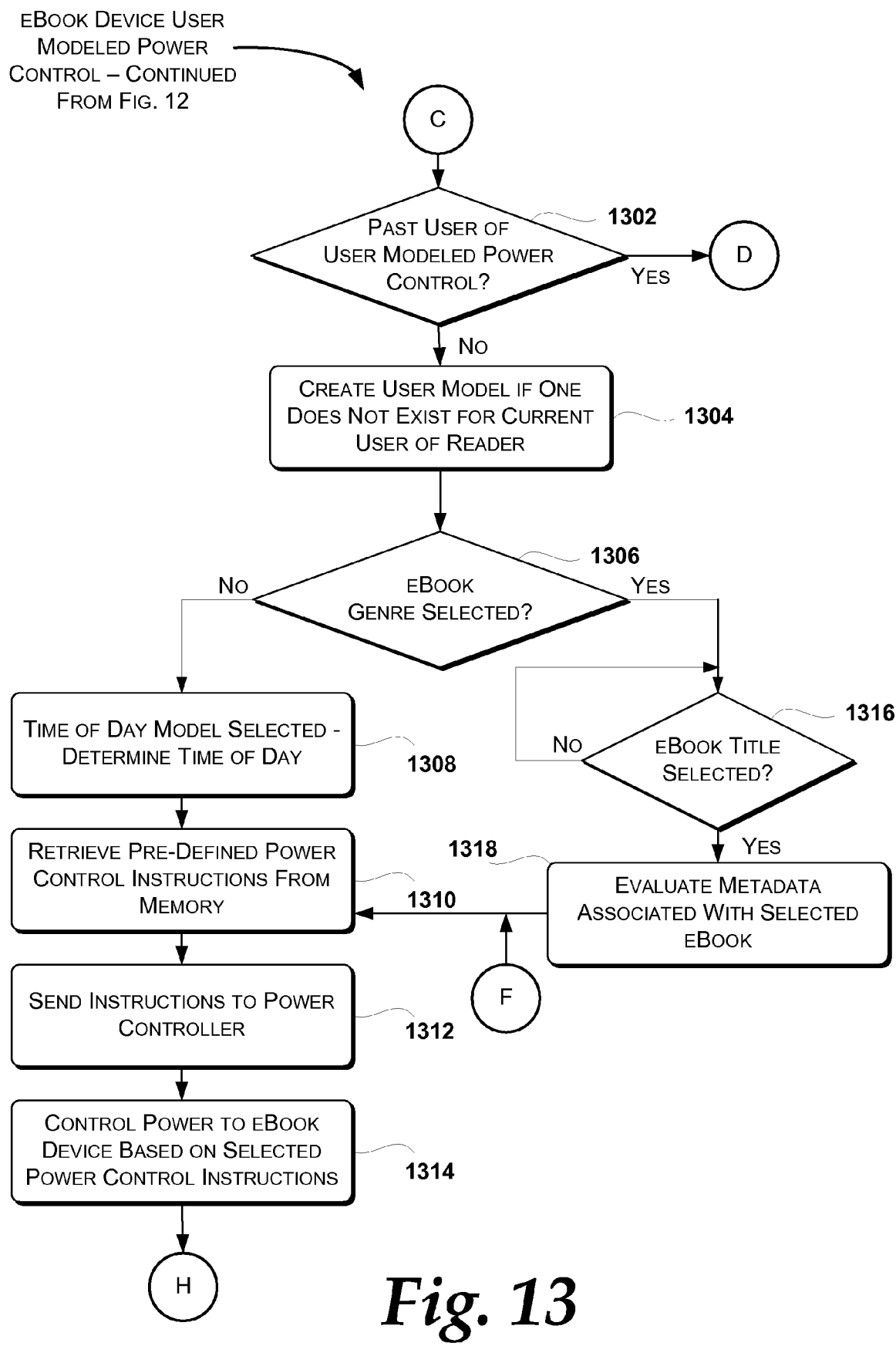

Referring to FIG. 13, at decision block 1302, the eBook reader device 100 determines if a current user previously used the user modeled power control mode. This is accomplished by scanning the user modeled section 224 for a user model (e.g., a user N model) linked to the current user. Information pertaining to the current user is known through a logon process associated with the eBook reader device 100. If a user model for the current user does not exist, the reader device 100 creates a user model that is linked to the current user (block 1304). The user model is placed in the user modeled section 224.

At decision block 1306, the eBook reader device 100 determines if the eBook genre user adapted category 704 was chosen from the user modeled section 702. At block 1308, since the eBook genre user adapted category 704 was not selected, a time of day (the user adapted time of day category 706 selected) is determined by referencing a clock kept by the operating system of the eBook reader device 100. Alternatively, the timer/clock 216 of the reader device 100 may be referenced. Based on the referenced time of day, at block 1310, a power control instructions set is retrieved from the power management section 146. For example, if it is the middle of the day, the power control instructions I set 318 may be retrieved from the power management section 146. The power control instructions I set 318 includes a shorter minimum power time period in anticipation that a user of the eBook reader device 100 will likely turn pages of an eBook at a faster rate as compared to other times of the day. At block 1312, the retrieved power control instructions set is sent to the power control unit 214. At block 1314, the power control unit 214 controls an amount power consumed by the eBook reader device 100 using the retrieved power control instructions set.

Figure 15:
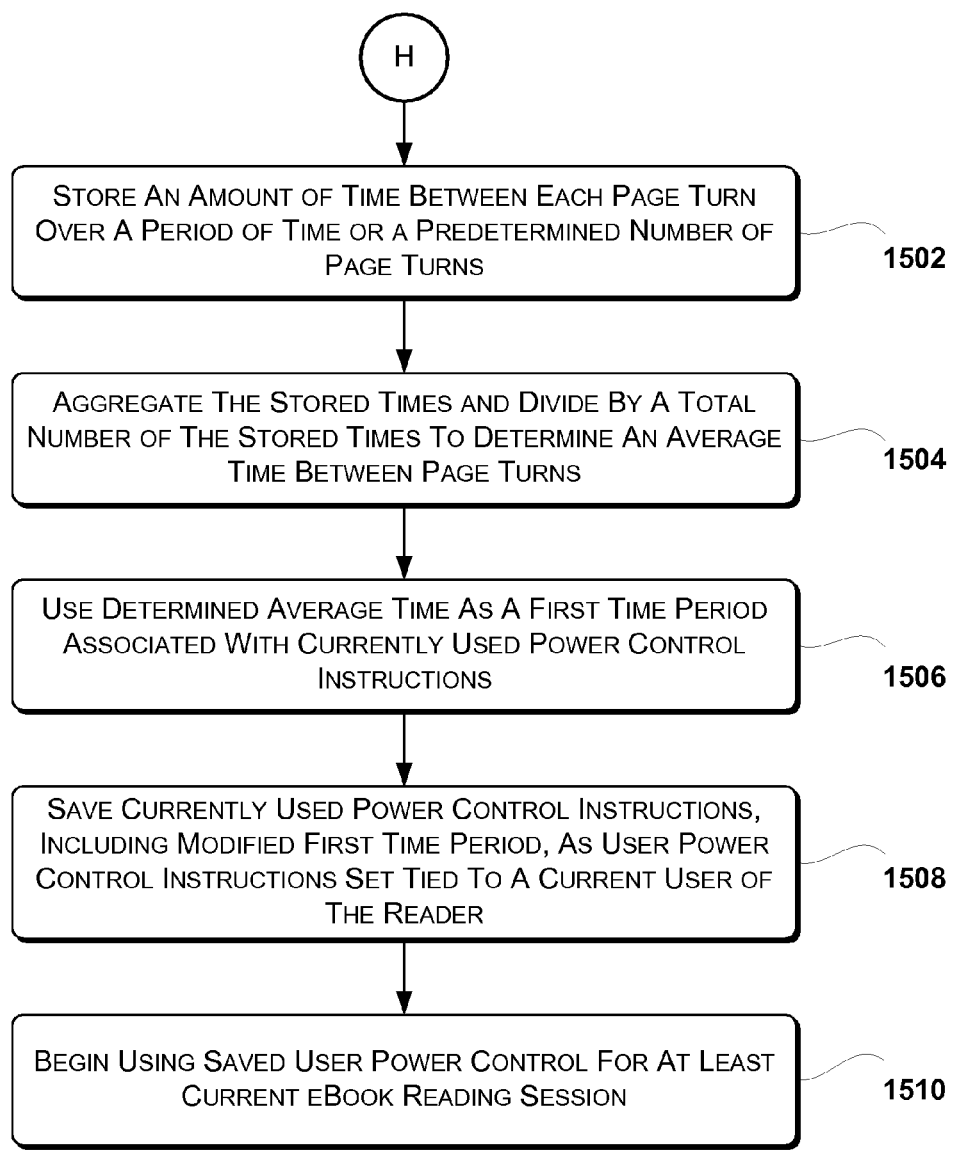

The retrieved power control instructions set is used by the eBook reader device 100 as a foundation in a process of creating user power control instructions sets that are associated the current user's user model. In FIG. 15, the eBook reader device 100, using the power management section 146, begins to observe a manner in which the current user reads an eBook. In particular, at block 1502, the power management section 146 observes and stores an amount of time between each page turn of an eBook being processed by the eBook reader device 100. A plurality of these times are observed and stored based on an elapsed time period or a predetermined number of page turns.

At block 1504, the plurality of stored times are aggregated and an average time between page turns is determined based on the aggregate time. At block 1506, the determined average time between page turns is used to replace the first time period associated with the currently used power control instructions set. For example, assuming the power control instructions I set 318 was chosen at block 1310, the first time period (30 seconds) is replaced with the determined average time between page turns. At step 1508, the power management section 146 saves the modified power control instructions set and associates the saved power control instructions set with the current user's user model (refer to the block 1304) stored in the user modeled section 224. More specifically, the current user now has an associated user model (e.g., user N model), a user power control instructions N set, and a power control instructions set that is associated with a time of day. At block 1510, the power management section 146 begins using the saved user power control instructions set for the current eBook reading session.

Returning now to FIG. 13, at decision block 1306, it is determined that the eBook genre user adapted category 704 was chosen from the user modeled section 702. A decision block 1316 determines if an eBook is currently being processed/displayed on the eBook reader device 100. If a user has yet to select an eBook for use with the reader device 100, the process illustrated in FIG. 13 waits until this occurs. After an eBook is selected from the eBook storage database 208, associated metadata is evaluated to determine a genre of the eBook (block 1318).

Based on the genre of the eBook, at block 1310, a power control instructions set is retrieved from the power management section 146. For example, if the genre is a non-fiction, the power control instructions II set 320 may be retrieved from the power management section 146. The power control instructions II set 320 includes an average minimum power time period in anticipation that a user of the eBook reader device 100 will likely turn pages of the eBook (non-fiction) at a slower rate as compared to various other genre types. At block 1312, the retrieved power control instructions set is sent to the power control unit 214. At block 1314, the power control unit 214 controls an amount power consumed by the eBook reader device 100 using the retrieved power control instructions set.

The retrieved power control instructions set is used by the eBook reader device 100 as a foundation in a process of creating user power control instructions sets that are associated the current user's user model. In FIG. 15, the eBook reader device 100, using the power management section 146, begins to observe a manner in which the current user reads an eBook. In particular, at block 1502, the power management section 146 observes and stores an amount of time between each page turn of an eBook being processed by the eBook reader device 100. A plurality of these times are observed and stored based on an elapsed time period or a predetermined number of page turns.

At block 1504, the plurality of stored times are aggregated and an average time between page turns is determined based on the aggregate time. At block 1506, the determined average time between page turns is used to replace the first time period associated with the currently used power control instructions. For example, assuming the power control instructions II set 320 was chosen at block 1310, the 40 second first time period is replaced with the determined average time between page turns. At step 1508, the power management section 146 saves the modified power control instructions set and associates the saved power control instructions set with the current user's user model (refer to the block 1304) stored in the user modeled section 224. More specifically, the current user now has an associated user model (e.g., user N model), a user power control instructions N set, and a power control instructions set that is associated with an eBook genre. At block 1510, the power management section 146 begins using the saved user power control instructions set for the current eBook reading session.

Returning again to FIG. 13, at decision block 1302, it is determined that the current user of the eBook reader device 100 previously used user modeled power control. This is accomplished by scanning the user modeled section 224 for a user model (e.g., a user N model) linked to the current user. Information pertaining to the current user is known through a logon process associated with the eBook reader device 100.

Figure 14:
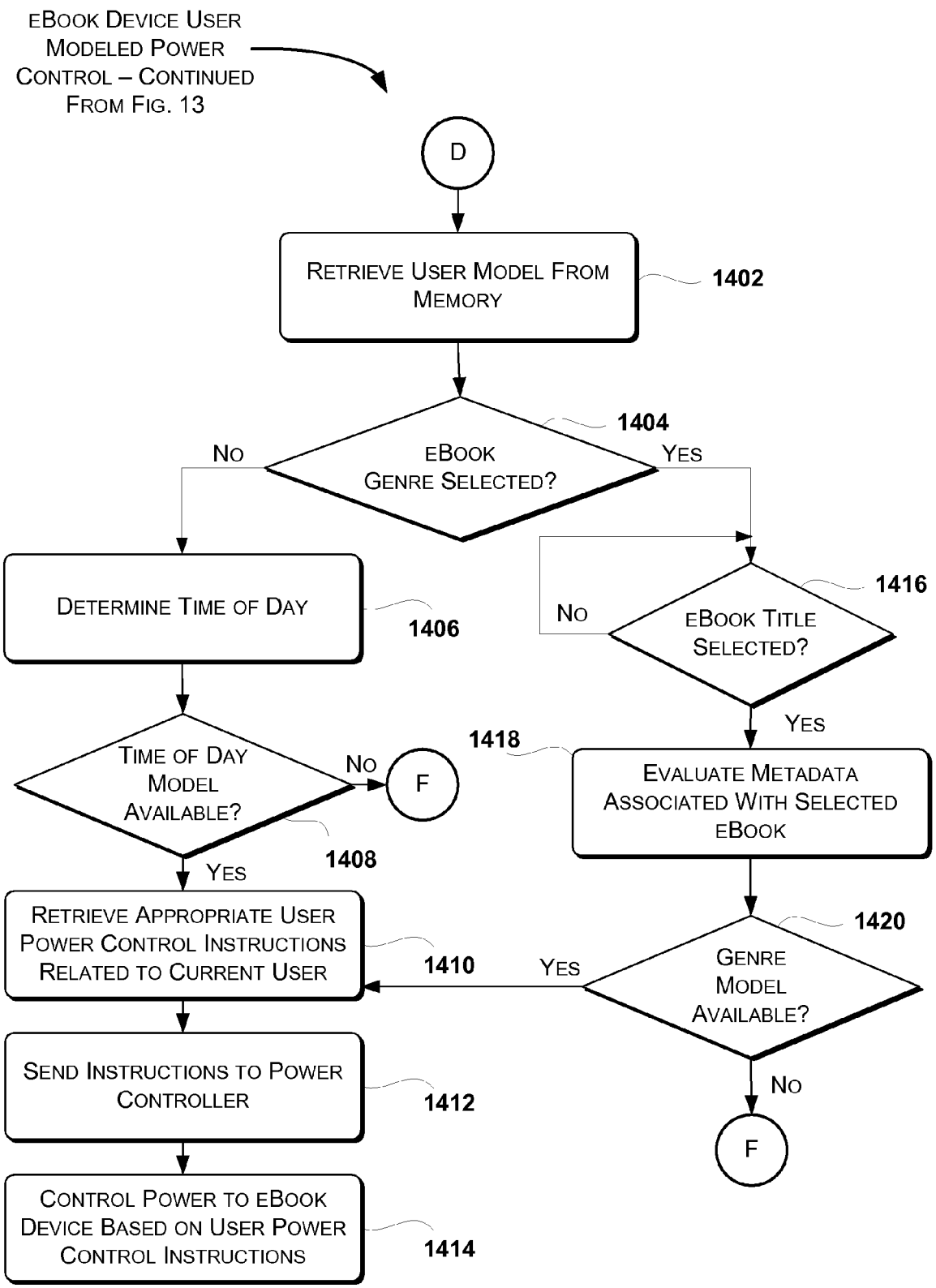

Referring now to FIG. 14, at block 1402, the current user's user model (e.g. a user N model) is referenced in the user modeled section 224. The referenced user model includes a link to the current user's user power control instructions N set stored in the power management section 146. At decision block 1404, it is determined that the eBook genre user adapted category 704 was not chosen from the user modeled section 702. At block 1406, since the eBook genre user adapted category 704 was not selected, a time of day (the user adapted time of day category 706 selected) is determined by referencing a clock kept by the operating system of the eBook reader device 100. Alternatively, the timer/clock 216 of the eBook reader device 100 may be used to determine the time of date.

At decision block 1408, the power management section 146 references the current user's user power control instructions N set to determine if a power control instructions set exists that is associated with the time of day determined in block 1406. If a set is found, at block 1410, the associated power control instructions set is retrieved from the power management section 146. At block 1412, the retrieved power control instructions set is sent to the power control unit 214. At block 1414, the power control unit 214 controls an amount power consumed by the eBook reader device 100 using the retrieved power control instructions set. At decision block 1406, if a power control instructions set is not found, the process described in relation to blocks 1310-1314 and blocks 1502-1510 is performed.

Returning to FIG. 14, at decision block 1404, it is determined that the eBook genre user adapted category 704 was chosen from the user modeled section 702. At decision block 1416, it is determined if an eBook is currently being processed/displayed on the eBook reader device 100. If a user has yet to select an eBook for use with the reader device 100, the process illustrated in FIG. 14 waits until this occurs. After an eBook is selected from the eBook storage database 208, associated metadata is evaluated to determine a genre of the eBook (block 1418).

At decision block 1420, the power management section 146 references the current user's user power control instructions N set to determine if a power control instructions set exists that is associated with the eBook genre determined in block 1418. If an associated power control instructions set is found, at block 1410, the associated power control instructions set is retrieved from the power management section 146. At block 1412, the retrieved power control instructions set is sent to the power control unit 214. At block 1414, the power control unit 214 controls an amount power consumed by the eBook reader device 100 using the retrieved power control instructions set. At decision block 1420, if a power control instructions set is not found, the process described in relation to blocks 1310-1314 and blocks 1502-1510 is performed.

Exemplary Power Graph

FIG. 16 is an exemplary power graph 1600 that illustrates power consumed by the eBook reader device 100 in accordance with one or more described power control implementations. When the reader device 100 is in a low power state (I), the processing unit 148 is in deep sleep mode. In this mode, the processing unit 148 is consuming a minimum amount of power, or no power at all. In general, in this mode, most or all of the subsystems 140 are drawing no power, or a minimum amount of power to maintain an acceptable user experience in relation to the reader device 100. The low power state illustrated in FIG. 16 is over the first time period defined by the power control instructions described herein.

A medium power state (II) is illustrated in FIG. 16. When the reader device 100 is in the medium power state, the processing unit 148 consumes more power than in the low power state (I). This is true of the remaining subsystems 140 as well. In general, the subsystems 140 are controlled by the power control unit 214 in a manner that ensures that at least one page can be placed in the immediate page memory 202 and prepared for rendering on the display 104. The medium power state is over the second time period defined by the power control instructions described herein.

A full power state (III) is illustrated in FIG. 16. When the eBook reader device 100 is in the full power state, the processing unit 148 is fully operational and is consuming more power than in the low and medium power states. This is true of the remaining subsystems 140 as well. Here, the subsystems 140 are controlled by the power control unit 214 in a manner that enables actual rendering of a page or pages on the display 104.

The full power state (III) occurs when the second time period expires. In an alternative implementation, the full power state occurs when a user of the reader device 100 initiates a page turn (e.g., actuation of button 110 or 112). The second time period would not be used if the reader device 100 is designed go to a full power state when a page turn is initiated.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic reader, comprising:
at least one processor;
a display driver coupled to the at least one processor to render content on a display of the electronic reader; and
memory coupled to the at least one processor and containing power control instructions that, when executed by the at least one processor, cause the at least one processor to perform acts comprising:
predicting when a user's next interaction with the electronic reader will occur based on the user's past interaction with the electronic reader, the user's interactions comprising electronic page turns of an electronic book stored in the memory of the electronic reader; and
controlling an amount of power consumed by the electronic reader based on the predicting, the controlling comprising:
initiating a first power state to control an amount of power consumed by the processor, the display driver, and the memory when content has previously been rendered and is currently being displayed by the electronic reader;
initiating a second power state different from the first power state to control an amount of power consumed by the processor, the display driver, and the memory when loading a next electronic page of content in the memory, and
initiating a third power state different from the first and second power states to control an amount of power consumed by the processor, the display driver, and the memory when rendering the next electronic page of content on the display of the electronic reader.

2. The electronic reader as recited in claim 1, wherein the first power state draws less power than the second and third power states, and wherein the second power state draws more power than the first power state and less power than the third power state.

3. An electronic reader, comprising:
at least one processor;
a display driver coupled to the at least one processor to render content on a display of the electronic reader; and
memory coupled to the at least one processor and containing power control instructions that, when executed by the at least one processor, cause the at least one processor to perform acts comprising:
predicting when a user's next interaction with the electronic reader will occur based on the user's past interaction with the electronic reader; and
controlling an amount of power consumed by the electronic reader based on the predicting, the controlling comprising:
initiating a first power state to control an amount of power consumed by the processor, the display driver, and the memory when content has previously been rendered and is currently being displayed by the electronic reader;
initiating a second power state different from the first power state to control an amount of power consumed by the processor, the display driver, and the memory when loading a next electronic page of content in the memory, and initiating a third power state different from the first and second power states to control an amount of power consumed by the processor, the display driver, and the memory when rendering the next electronic page of content on the display of the electronic reader;

wherein the first power state draws less power than the second and third power states, and the second power state draws more power than the first power state and less power than the third power state.

4. The electronic reader as recited in claim 3, wherein the user's interactions with the electronic reader comprise electronic page turns of an electronic book stored in the memory of the electronic reader.

* * * * *